United States Patent [19]

Hart

[11] 4,251,568
[45] Feb. 17, 1981

[54] METHOD OF STORING ELECTRICAL ENERGY

[75] Inventor: Thomas G. Hart, Royal Oak, Mich.

[73] Assignee: Energy Development Associates, Inc., Madison Heights, Mich.

[21] Appl. No.: 70,110

[22] Filed: Aug. 27, 1979

[51] Int. Cl.³ .................................. H01M 10/44
[52] U.S. Cl. .............................. 429/49; 429/50; 429/105; 429/199
[58] Field of Search ............ 429/50, 49, 199, 200, 429/105, 218, 21; 320/2; 204/2.1

[56] References Cited

U.S. PATENT DOCUMENTS

| | | | |
|---|---|---|---|
| 2,658,099 | 11/1953 | Basset | 429/218 |
| 3,288,641 | 11/1966 | Rightmire | 429/200 |
| 3,640,771 | 2/1972 | Zito | 429/93 |
| 3,713,888 | 1/1973 | Symons | 429/51 |
| 3,719,526 | 3/1973 | Zito, Jr. | 429/199 |
| 3,793,077 | 2/1974 | Behling | 429/199 X |
| 3,811,946 | 5/1974 | Crentz et al. | 429/199 X |
| 3,984,749 | 10/1976 | Muller | 429/50 X |
| 4,105,829 | 8/1978 | Venero | 429/50 X |
| 4,124,741 | 11/1978 | Hart | 429/105 |
| 4,128,701 | 12/1978 | Maricle | 429/21 |
| 4,146,680 | 3/1979 | Carr et al. | 429/51 |

Primary Examiner—Anthony Skapars
Attorney, Agent, or Firm—Amster, Rothstein & Engelberg

[57] ABSTRACT

A method for the useful storage of electrical energy is described in which an electrochemical cell employing a halide electrolyte and an ungraphitized carbon positive electrode is charged at a voltage substantially below the conventional decomposition voltage required to produce free halogen from the selected electrolyte. An unidentified chemical complex is formed and stored at the positive electrode, and the positive electrode may thereafter be employed as an electrical energy source in a primary or secondary battery.

13 Claims, 3 Drawing Figures

METHOD OF STORING ELECTRICAL ENERGY

BACKGROUND OF THE INVENTION

Secondary batteries employing aqueous metal halide solutions as electrolytes and free halogens as the electroactive material are extremely well known and have been extensively described in prior patents and literature. In secondary batteries of the foregoing type, a voltage is applied to the cell sufficient to result in the production of free halogen at the positive electrode. More recent patents dealing with the foregoing system have been concerned with the development of methods and apparatus for the efficient storage of the halogens formed during the charging phase of battery operation in a manner which would make the halogen available for reintroduction into the electrolyte during discharge of the battery. Thus, for example, Symons U.S. Pat. No. 3,713,888 describes a method and apparatus for converting the free halogen to halogen hydrate utilizing auxiliary apparatus external to the battery compartment and Zito U.S. Pat. No. 3,719,526 describes specially designed electrodes for entrapping the free halogens. The foregoing system as well as many others which are based on the same electrochemical action suffer from several disadvantages such as the potential emission of noxious halogen gases and the need for auxilliary apparatus.

Because of the foregoing drawbacks of systems based on halogens as the electroactive material, secondary batteries of the lead-acid type which are highly transportable and which require no auxilliary pumps or other apparatus for continuous charge and discharge are in widespread commercial use. Lead-acid type batteries are, however, highly poisonous and corrosive and the amount of energy stored per unit weight is relatively low. A need has long existed in the art for an energy storage method having the desirable features of lead-acid type batteries but which is capable of storing higher amounts of energy per unit weight and in which the content of the battery is less noxious and corrosive.

SUMMARY OF INVENTION

This invention is directed to a method of storing electrical energy which is useful in the operation of a battery and which makes it possible to achieve the higher energy densities associated with batteries employing electrolytes which normally produce at least one gaseous component at the positive electrode. By virtue of the method of this invention a secondary battery may be constructed which requires no pumps or other auxiliary apparatus for storage of the electroactive material and which may therefore be constructed in the compact, transportable form associated with lead-acid type batteries. In contrast to the lead-acid batteries which depend upon the use of a lead cathode and a sulfuric acid electrolyte, the method of the present invention can be applied to a wide variety of electrolytes and negative electrode materials thereby making possible batteries exhibiting different performance characteristics. It will also permit the use of safer and cheaper materials.

It is a well established principle that in the operation of an electrochemical cell the voltage applied to the cell during charging must be sufficient to sustain the chemical reaction which occurs during charge. According to this principle only a small amount of current will flow in cells in which the reaction involves the decomposition of the electrolyte when operated below the applied voltage required for decomposition. This voltage, known as the "decomposition potential" can be empirically determined and standard values have been published for decomposition of many electrolytes, including many halide electrolytes. Accordingly, in conventional operation of electrochemical cells employing halide electrolytes, the voltage applied to the cell during charging is above the known decomposition potential which would result in the plating out of the metal component at the negative electrode and liberation of free halogen at the positive electrode.

It has now been discovered that the use of selected carbon electrodes in any electrochemical cell employing an aqueous halide electrolyte allows the cell to be efficiently operated at voltages which are significantly below the decomposition potential of the electrolyte required to produce free halogen to store a substance directly in the carbon electrode without the significant production of free halogen and without significant liberation of carbon oxides or consumption of the electrode. The specific nature of the chemical substance produced and retained within the carbon electrode by the method of this invention is not known. While not wishing to be limited to any particular theory, it is believed that the chemical substance retained by the carbon is a complex of carbon and a component or components of the electrolyte. That such complexes can form is corroborated by existing literature. See Hine, et al., "Chlorine and Oxygen Electrode Processes on Glasslike Carbon, Pyrolytic Graphite and Conventional Graphite Anodes", *Journal of Electrochemical Society*, June, 1974; Puri, "Surface Complexes on Carbons, *Carbon*, Dekker, 1974. Irrespective of the nature of the complex, the fact that no free halogen is formed provides the method of this invention with improved safety, simplicity and economy as compared to other halide batteries and permits the construction, performance and utility of lead-acid type batteries.

Although the method of the invention, in a presently preferred embodiment, relates to the use of halide electrolytes in cells which are operated below the voltage required to produce free halogen at the positive electrode, the principle on which the invention is based, i.e., a storage effect in selected carbon electrodes, is believed to be applicable to a broader range of electrolytes and operating conditions. Thus, for example, a wide variety of known sulfate, phosphate, nitrate, hydroxide or chromate electrolytes can be employed in cells utilizing the selected carbon positive electrodes in order to store some chemical substance in the carbon electrode which is a complex of carbon and some component or components of the electrolyte while operating at an applied voltage which is below the normal decomposition voltage required to liberate some component or components of the electrolyte at the positive electrode for the selected electrolyte.

DETAILED DESCRIPTION OF THE INVENTION

A process is described for charging an electrical energy storage device having an electrode compartment containing therein at least one positive electrode and one negative electrode, in which the positive electrode is formed from ungraphitized carbon, and an aqueous halide electrolyte. A current is continuously permitted to flow through the electrolyte but the current is controlled such that the measured voltage across the electrodes is maintained below the decomposition voltage required to produce free halogen. As a result of the foregoing method, a component of the electrolyte is retained at the carbon positive electrode. The stored energy can be recovered as electrical energy by coupling the electrodes to a resistive load or by removing the charged carbon electrode and employing it in some other electrochemical device. Thus the method of the invention, in a preferred embodiment, is applied to the charging and discharging of a secondary battery.

As used herein, the term "reversible decomposition potential" or "reversible decomposition voltage" refers to the theoretical voltage or reversible potential associated with the Gibbs Free Energy change of the particular chemical reaction undergone by the electrolyte as calculated by the following well known formula: $-\Delta G = EnF$. Where $-\Delta G$ is the change in Gibbs Free Energy: E is the reversible potential; F is the Faraday i.e., the quantity of electricity that can deposit or dissolve one gram equivalent weight of a substance during electrolysis and n is the number of equivalents. The reversible potential can be readily calculated for any electrolyte from handbook data for the Gibbs Free Energy of formation. As used herein "decomposition potential" or "decomposition voltage" refers to the voltage actually required to decompose an electrolyte into its components. The decomposition potential normally exceed the reversible potential by an overvoltage which is required in order to overcome irreversible effects. The decomposition voltage may be determined empirically for specific cells by well known methods described in electrochemical texts.

The invention will be further understood by references to the following detailed description, examples and drawings in which.

Although the use of carbon as the positive electrode is an essential feature of the invention, the specific nature of the carbon may vary widely and still achieve the storage effect of the invention albeit that the extent of that effect may also vary widely depending on the specific nature of carbon employed. The carbon is preferably ungraphitized, i.e., it should not have been exposed to temperatures above about 1000° C. for extended periods of time. Thus, for example, coal-coke carbon obtained by heating coal so as to distill off volatile material is normally processed at temperatures considerably lower than 1000° C. and is therefore usually ungraphitized. It is also preferred that the carbon have a high degree of porosity of the type consisting mainly of microscopic and sub-microscopic pores which allow easy access of the electrolyte throughout the carbon. The carbon should also be relatively free of impurities which would be leached out by the electrolyte, thereby weakening the electrode or interfering with normal electrolytic action or the desired storage effect. Obviously, the nature of such impurities will vary with the specific nature of the electrolyte and carbon selected.

It will be appreciated by those skilled in the art that the treatments applied to commercially available carbons vary widely and important details of such treatments are maintained as trade secrets by manufacturers. Accordingly, some degree of routine experimentation may be required to determine the most suitable carbon for use with a particular electrolyte. Examples of commercially available carbons which may be employed are Union Carbide Grade 9LXC which has consistently given capacities equivalent to better than 20 watt hours per pound of battery weight in battery use; and Airco Speer Corporation, Grade 37C.

Figures 1, 2:
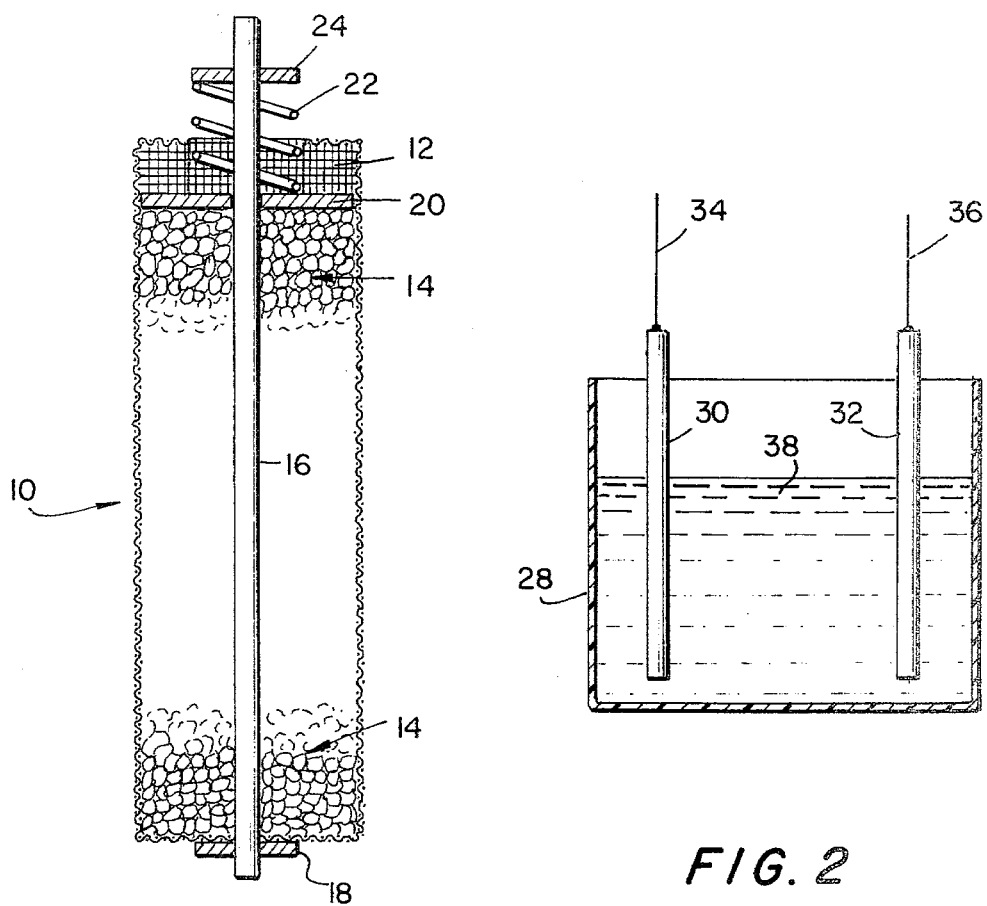
FIG. 1 is a cross sectional view of a preferred carbon anode for use in the method of the invention.
FIG. 2 is a schematic illustration in vertical cross section showing an individual cell to which the method of the invention is applied.

While the carbon electrode may be employed in solid block form, a preferred carbon anode, depicted in FIG. 1, employs carbon in granular or pellet form. The use of carbon in granular or pellet form has been found to reduce hysteresis effects such that the charging voltage declines only a relative small amount when charge is interrupted. More importantly, such a granular electrode permits charging at higher current for longer periods of time before the decomposition voltage required to produce free halogen is reached, as compared to solid carbon electrodes, thereby indicating higher storage capacity.

Referring to FIG. 1 there is illustrated a cylindrical carbon anode 10 formed from open weave polypropylene mesh 12. The size of the openings in the mesh is selected so as to prevent carbon granules 14 from falling through the mesh. A current conducting rod 16 extends vertically through the cylinder 10 and is held at its lower end by a nut or washer 18. The rod 16 serves no electrolytic function and is formed from a material having a reasonably low contact resistance with carbon, e.g. graphite. The upper end of the electrode structure is provided with a spring assembly which exerts moderate downward pressure on the carbon granules. The spring assembly consists of a loose polypropylene or titanium washer 20, a titanium wire spring 22 and a fixed titanium or polyprophylene nut or washer 24. Other comparable structures capable of holding the carbon granules in electrical contact with each other will readily occur to those skilled in the art.

It is a further feature of the invention that the desired storage properties of the carbon may be enhanced by treatment with concentrated nitric acid. The mechanism of this action is not completely understood but it is believed that such a treatment removes impurities from the carbon; increases microporosity; increases oxygen content, and increases wettability by halide electrolytes. In one experiment, highly compacted Airco Speer, Grade 37 C carbon was boiled in concentrated nitric acid for 8 hours, thoroughly washed with water and heated for 1 hour at 200° C. The "apparent electrical capacity" was measured in 25% highly pure aqueous zinc-chloride using treated and untreated carbon as the positive electrode and titanium as the negative electrode and an applied voltage below 1.5 volts. The apparent capacity was less than 0.01 farad/cm$^2$ of electrode external surface area prior to treatment and 300 farad/cm$^2$ after treatment. The results achieved by nitric acid treatment serve to confirm the desirable properties required for carbon positive electrodes employed in the method of the invention. It is, of course, understood that such properties also exist in certain types of carbon which have not been treated with nitric acid or have been treated by other techniques which enhance these desirable properties.

The nature of the negative electrode employed in the method of the invention is not critical and any of the materials conventionally employed for such purposes are acceptable. This would include ungraphitized carbon comparable to the material used at the positive electrode, graphite, iron, and titanium. Some of the significant factors to be considered in the selection of the negative electrode are cost, weight, and the nature of the electrolyte being employed. In one specific embodiment of the invention, which is further described in the specific examples, a previously "charged" positive electrode and an ungraphitized carbon negative electrode are employed in combination with an aqueous HCl electrolyte as a battery which exhibits a capability of being repeatedly discharged and re-charged. For that application, aqueous solutions containing less than 20% HCl are preferred.

A wide range of aqueous iodide, bromide, and preferably, chloride, electrolyte solutions may be employed in the method of the invention. Such electrolyte solutions are well known in the art and are identified, for example, in U.S. Pat. No. 3,713,888. Preferably, the metal component of the electrolyte does not react rapidly with water; should not produce hydrogen directly as a consequence of voltages naturally existing in the battery; should be relatively inexpensive in pure form, i.e., in a form which is free of impurities which produce hydrogen or otherwise degrade performance of the electrolyte or electrodes; and should not be greatly affected by impurities which leach out of the carbon electrode. In addition, the electrolyte should be stable under normal battery conditions; should have adequate conductivity, solubility and viscosity characteristics; should not dissolve gasses, such as oxygen; should show at least some tendency to dissolve the metal hydroxide so that an equilibrium situation exists for limiting hydroxide production accompanying hydrogen generation; should not lose water rapidly; and should be inexpensive. Many of the foregoing properties can be achieved through the use of well known additives such as ammonium chloride, calcium chloride or other materials known to reduce oxidation, evaporation, corrosion, dentrite formation or increase electrolytic conductivity. It will also be appreciated by those persons skilled in the art that a particular electrolyte need not fully meet all of the foregoing criteria in order to be useful.

Preferred metal halides are zinc, cadmium, nickel, lead, iron, tin and manganese although a wide variety of other metal halides identified in the prior art as potential electrolytes may be employed. In addition, as will be described more specifically in the examples, aqueous halogen acid solutions, e.g., hydrochloric acid may also be utilized as the electrolyte.

The concentration of the aqueous metal halide electrolyte is not critical and may range from 0.1% by weight to saturation, preferably about 5 wt % to saturation and, more preferably, about 10 wt % to 50 wt %. It is of course, well known that electrolyte properties vary somewhat with concentration and, accordingly, an optimum concentration or concentration range must be separately determined for each electrolyte.

FIG. 2 illustrates a typical single cell device constructed to operate in accordance with the method of the invention. The cell 26 consists of an outer container or casing 28 which may be constructed, for example, of high density polyethelyne. The negative electrode 30 and carbon positive electrode 32 are electrically connected through lines 34 and 36 respectively to an external DC power supply (not shown) and their opposite ends are immersed in an aqueous electrolyte 38. Those skilled in the art will recognize that the foregoing structure is typical of a single cell of a battery and that such a cell would be disconnected from the power supply and connected to a suitable load during discharge operation. It will also be apparent that an actual battery would normally include a multiplicity of cells as described above and that many such multiple cell structures are described in the art.

The method of the invention is critically dependent on operation at conditions which do not produce free halogen gas at the positive electrode. Accordingly, the charging current applied to the cell must be maintained below the value which would produce a voltage above the decomposition potential of the selected electrolyte which would result in liberation of free halogen at any time during the charging process. Preferably the voltage will not exceed the reversible decomposition potential of the electrolyte. The optimum charging current will, of course, vary widely, depending upon the specific physical form and nature of the carbon employed as the positive electrode as well as the nature of the electrolyte. As typical examples, the method of the invention can be employed with an aqueous cadmium chloride solution to fully charge a cell at 1.5 volts as compared to the reversible decomposition voltage of 1.75 volts for cadmium chloride solutions in which the products are cadmium metal and free chlorine. Such a cadmium battery, in a one-kilowatt hour size, would have an open circuit voltage of about 1.5 volts and an energy density in excess of 30 watt-hours per pound of battery weight. An aqueous zinc chloride solution can be fully charged at less than 1.8 volts as compared to a reversible decomposition voltage greater than 2.1 volts and would exhibit an open-circuit voltage of about 1.8 volts and an energy density greater than 35 watt-hours per pound.

The invention will be further understood by references to the following illustrative examples.

EXAMPLE 1

Figure 3:
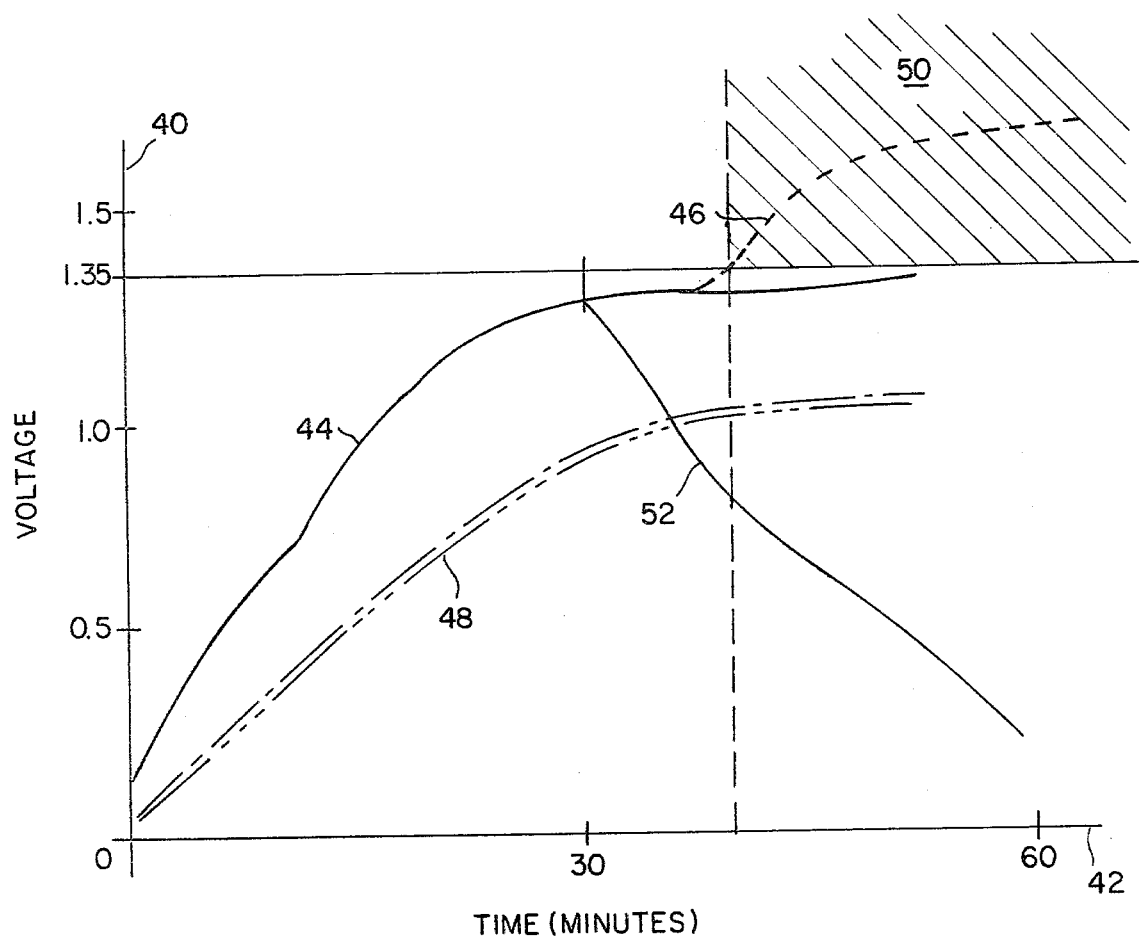
FIG. 3 is a graph illustrating the relationship between voltage and time for experiments conducted with a hydrochloric acid electrolyte in the apparatus of FIG. 1.

The apparatus of FIG. 2 was provided with a positive electrode formed of a 10 cm. long×2 cm. diameter rod of Airco Speer, Grade 37 C carbon. The rod had been boiled in concentrated nitric acid for about 8 hours and thereafter thoroughly washed and dried. The cathode was platinized Union Carbide, Grade ATJ graphite of the same dimensions as the anode and the electrolyte was about 400 m. of a 5% hydrochloric acid solution. A voltage sufficient to drive a current of about 0.5 amp is applied from the DC power supply and sustained. This 0.5 amp current provides a current density, in terms of superficial area of about 10 ma/cm$^2$. The change in voltage with time, while sustaining the 0.5 amps, is observed and may be recorded on an automatic recorder to produce a diagram as shown in FIG. 3. A gas is observed to bubble from the negative electrode and is easily verified to be substantially entirely hydrogen and to be at a rate given by Faraday's law in conformance with 0.5 amps of current. Apart from an initial minor bubbling when first immersed in the electrolyte, no gas evolution is observed from the positive electrode, at least for the first half hour.

Referring now to FIG. 3, 40 is the vertical line indicating a voltage from 0 to 1.5 volts, 42 is the horizontal line indicating time from 0 to 60 minutes, 44 is the curved line indicating the actual voltage, between the electrodes 2 necessary to sustain a current of 0.5 amps, from a clean start. It will be noted that the voltage indicating by line 44 climbs steadily for about the first 30 minutes and then begins to steady out at about 1.3 volts. Dotted line 46 which is a continuation of line 42 indicates the effect of an increase in current to 1.0 amps at the 40-minute time point. Double-dotted line 48 indicates roughly the voltage which at any time would briefly sustain a current of 0.01 amps after having sustained 0.5 amps up to that time. Shaded region 50 indicates roughly that portion of the experiment in which free chlorine was detected in the electrolyte, withdrawn from close to the positive electrode by potassium iodide test. It will be noted that the shaded portion is above the vertical line at 1.35 volts which is the decomposition potential of a 5% aqueous HCl electrolyte. Some slight gassing from the anode including oxygen and carbon dioxide is observed in shaded region 50. Voltages indicated by lines 44, 46 and 48 all show substantial hysteresis if the progress of the experiment is interrupted and delayed.

Referring still to FIG. 3, curved line 52 indicates the voltage obtained when the above experiment is interrupted at the 30-minute point, when, additionally, the DC power supply is disconnected and when, additionally, a variable resistor is connected between the electrodes and continually adjusted to maintain a current of 0.5 amps. In other words, if curved line 44 indicates a "charge" condition, the curved line 52 indicates a "discharge" condition. Of course, hydrogen is added to facilitate the discharge to the extent necessary.

The conclusions that may be reached from the results of the experiments conducted with the apparatus of FIG. 2, as detailed in FIG. 3 and described above, are as follows:

(a) 5% hydrochloric acid may be decomposed electrolytically, using a carbon anode as above, at a voltage below 1.2 volts with production of hydrogen at the negative electrode and storage of a substance containing at least in part chlorine in the carbon positive electrode.

(b) The hydrochloric acid decomposition as in (a) is accomplished apparently without production of free chlorine even at the positive electrode surface, so long as the charging current is maintained below the decomposition voltage and further so long as a certain length of time related to both current density and positive electrode properties including bulk is not exceeded.

(c) The electrolytic-storage in the carbon positive electrode of the substance containing at least in part chlorine is highly reversible. By measuring only a very small voltage change as a consequence of changing a positive current flow of 0.01 amps to a negative flow of 0.01 amps, it may be deduced that no substantial loss of free energy is involved in the storage.

(d) The electrolytic storage in the positive electrode does not depend on continuous contact between the electrolyte and electrode after charging has been completed since the elapsed time between the measurement of (charge) curve 44 and "discharge" curve 52 apparently has no effect upon curve 52 after allowing for initial hysteresis effects, as described below, within the carbon anode. In fact, the electrolyte can be entirely changed with little effect and indeed the carbon electrode can be washed, dried, and stored for months or more between "charge" and "discharge" without substantial change in curve 52. Charged carbon electrodes have been washed with hot water and boiling 10% sodium hydroxide solutions and dried to constant weight without loss of the electroactive material thereby eliminating the possibility that the stored material is stored free halogen. The carbon electrodes do, however, show a 15 to 25% weight gain as compared to an uncharged electrode. This feature of the storage effect of the invention makes it possible to create highly transportable energy storage elements in the form of "charged" carbon electrodes which may then be incorporated in a variety of electrochemical structures such as batteries on similar devices as a highly convenient renewable energy source.

(e) There is a pronounced hysteresis effect within the carbon positive electrode due to the bulk of the electrode and possibly due to gas entrapment. This may be confirmed by replacing the solid carbon electrode with a hollow electrode of similar dimensions. The results obtained with the hollow electrode are, at first, very similar to the results obtained with the solid electrode, indicating action inside the electrode lags well behind action at the surface.

In a separate series of experiments employing the granular carbon positive electrode of FIG. 1, hysteresis effects were markedly reduced and there was a much slower rise in voltage with time before approaching the decomposition potential required to produce free halogen thereby indicating a higher storage capacity. In fact, the use of a granular carbon electrode of FIG. 1 containing about 15 grams of Union Carbide Grade 9LXC carbon in 6×8 standard mesh size in the apparatus of FIG. 2 a charging current of 1 amp. was sustained for at least 4 hours before the voltage exceeded 1.2 volts. The decomposition voltage of 5% HCl so as to produce free chlorine is about 1.35 volts. Thus, using 5% hydrochloric acid at least 120 amp hours per pound of granular carbon can be stored under the foregoing conditions.

Of course during the "charge" as described above hydrogen is evolved at the negative electrode and escapes. Thereafter, for the carbon electrode to be discharged requires that hydrogen be supplied to the negative electrode. If hydrogen is so supplied and a resistive load connected across the two electrodes, the amount of discharge will closely equal the amount of charge.

If cadmium chloride is employed as the electrolyte instead of hydrochloric acid and if, therefore, cadmium metal is deposited at the negative electrode rather than evolving hydrogen, the electroactive material storage in the carbon electrode is also at least the equivalent of 120 ampere hours per pound of carbon since the storage process at the carbon positive electrode seems almost independent of the electrolyte used. The cadmium deposited during "charg" is, of course, available for "discharge", as in a battery cell. By way of illusration of a battery capability, a total battery weight four times carbon electrode weight is a conservative assumption based on well-known practice. Accordingly, 120 amp hours per pound of carbon converts into 30 amp hours per pound of battery. Typical conservative estimates of battery resistances for the cadmium chloride system, also based on well-known practice, lead to an estimated average discharge voltage of 0.8 volts for a cadmium battery in accordance with the present invention. Hence the total discharge energy of such a cadmium chloride battery employing the Union Carbide 9LXC carbon as the positive electrode, would be about 24 watt hours per pound of battery, according to the above calculations based on experimental fact.

It will be understood, of course, that even though the amount of energy stored in the carbon is largely independent of the metal component of the electrolyte, the amount of energy storage in the overall battery depends in part upon the metal component. Hence, different metal components will give different energy contents.

EXAMPLE 2

An experimental set-up substantially identical to FIG. 2 and Example 1 was employed except that both the positive and negative electrodes were formed from Airco Speer Grade 37 C carbon rods which had been nitric acid treated. The carbon positive electrode had been previously "charged" as described in Example 1. The DC power supply was connected across connections 34 and 36 so that the negative electrode was 30 and the positive electrode was 32 as shown in FIG. 2. The voltage was then measured under three conditions; firstly, with current of 0.01 amp flowing so as to "discharge" the positive electrode; secondly, with current of 0.01 amp flowing so as to "charge" the positive electrode; and thirdly, with zero current flowing. Under the above three conditions, at least briefly, the three voltages were all closely the same at about 0.7 volts. Next, the power supply was disconnected and a resistor was connected in its place along with an ammeter and voltmeter to measure current and voltage. The resistor was of a size which allowed a starting current of 0.5 amps and a starting voltage of about 0.6 volts. Over a period of about 15 minutes the current dropped to about 0.1 amps and the voltage dropped to about 0.1 volts. Next, the resistor was disconnected and the DC power supply reconnected but this time the polarity was reversed so that rod 32 was the negative electrode and rod 30 was the positive electrode. The power supply was turned on so as to provide and maintain about 0.5 amps of current. Over a period of about 10 minutes the voltage changed from about 0.1 volt positive through zero to about 0.7 volts negative. Recalling the first step, in the above experiment, which was to measure the voltage under the three conditions of "discharge" at 0.01 amp, "charge" at 0.1 amp and zero current the situation was exactly the same as then, yielding 0.7 volts but with the polarity reversed and with the roles of the electrodes interchanged. In other words, having first "charged" either one of the carbon electrodes, this "charge" could be transferred from one to the other backwards and forwards an indefinite number of times. Hence, the apparatus exhibits all the properties of an electric battery. Furthermore, if the electrolyte which was 5% hydrochloric acid is replaced with any other stable chloride solution, for example, 25% sodium chloride, the only discernable effect on the "charge"-"discharge" performance of the apparatus is an increase in electrolyte resistance, manifested as a modest change in voltage-current relationship The conclusions that may be reached from the results of the above experiments are as follows:

(a) The substance containing at least in part chlorine which may be electrolytically stored in carbon is in part transferrable, apparently without change, to other similar carbon by electrolytic action.

(b) A voltage of about 0.7 volts is developed between carbon, as above, with a high "charge" and carbon, as above, with a low charge.

(c) The voltage developed between two carbons, as above, each with different "charge" is highly reversible, which is to say the three voltages measured under the three conditions of small positive, small negative and zero current are substantially the same.

(d) The mechanism of "charge" and "discharge" including the magnitude of reversible voltage in the situation of where both electrodes employ the carbon of the invention is apparently independent of the metal or other component of an aqueous electrolyte so long as the electrolyte is itself stable. Thus, the energy storage technique of the invention can be used as a secondary battery without the need to plate out a metal at the negative electrode during charging or to dissolve that metal during discharge.

EXAMPLE 3

Experiments similar to Example 1 were performed in which a titanium negative electrode was substituted for the platinized graphite negative electrode and a 35 wt % aqueous cadmium chloride electrolyte was employed in lieu of the hydrochloric acid electrolyte.

A voltage from a DC power supply was applied for about 30 minutes so as to maintain a 0.5 amp current and thereafter was increased to about 1.4 volts. The power supply was then disconnected causing the measured voltage between the electrodes to drop from 1.4 volts to about 1.0 volts over a period of about five minutes but to remain steady thereafter. A resistor was connected between the electrodes so as to "discharge" the apparatus and the current-time relationship was recorded and was found to be almost equal to the current-time relationship during charging.

The foregoing series of steps was repeated except that the "discharge" step was delayed for a week. The same results in terms of the current-time relationship were obtained.

The conclusions that may be reached from the above experiment are as follows:

(a) Cadmium chloride is electrolytically decomposed at a voltage below 1.4 volts with cadmium deposition on a titanium negative electrode and with storage of a substance in a carbon positive electrode.

(b) As a consequence of the above electrolysis there is no substance in the electrolyte which combines with the deposited cadmium so as to deplete the "charge", even on prolonged stand.

(c) The "charging" action upon the carbon electrode produces pronounced storage hysteresis in that the "open circuit" voltage declines considerably when the charge is interrupted. This is to say, if attainment of 1.4 volts, to pass a current of 0.5 amps, is taken to indicate the completion of desirable charge, then the first indication is premature due to hysteresis. Substitution of the granular carbon anode of FIG. 1 reduces this effect and permits higher storage capacities.

It will be readily appreciated by those persons skilled in the art that the novel storage technique of the invention can be applied to the construction of a wide variety of batteries or other energy storage devices. In the case of halide batteries, the absence of free halogen in the electrolyte will provide a considerable advantage in such batteries since a separator or other halogen diffusion-preventing means is not required and the hazards associated with the escape of halogen gasses into the surrounding atmosphere is avoided.

What is claimed is:

1. A method of charging an electrical energy storage device having an electrode compartment means containing therein at least one positive and one negative electrode comprising the steps of providing a positive electrode consisting essentially of ungraphitized carbon as the active electrode material, providing an electrolyte solution containing an aqueous halide which contacts the positive and negative electrodes, and passing a current through said electrolyte, said current being maintained at a level which maintains the voltage below the decomposition voltage of said halide electrolyte which would result in formation of free halogen.

2. The method of claim 1 in which said ungraphitized carbon is in granular form and said granules are maintained in electrical contact with each other.

3. The method of claim 1 in which said carbon is pretreated with nitric acid.

4. The method of claim 1 wherein said halide electrolyte is a chloride.

5. The method of claim 1 wherein said halide electrolyte is selected from the group consisting of iron, cadmium, zinc, nickel, lead, tin and manganese chlorides.

6. The method of claim 1 wherein said electyrolyte is an aqueous hydrogen chloride solution and said negative electrode is ungraphitized carbon.

7. A method of storing and recovering electrical energy which comprises providing at least one electrochemical cell containing at least one positive and one negative electrode and an electrolyte in contact with said electrodes, said positive electrode being formed of ungraphitized carbon, said cell containing an aqueous halide solution containing said electrodes, charging said cell by passing a current through said electrolyte, said current being maintained at a level which maintains the voltage below the decomposition potential of the halide electrolyte which would result in formation of free halogen, discontinuing the passage of current and recovering electrical energy by discharging said cell.

8. The method of claim 7 further including the steps of removing said positive electrode from said cell subsequent to said charging step, employing the charged positive electrode as the positive electrode in a second electrochemical cell and recovering electrical energy by discharging said second electrochemical cell.

9. The method of claim 7 in which said ungraphitized carbon is in granular form and said granules are maintained in electrical contact with each other.

10. The method of claim 7 in which said carbon is pretreated with nitric acid.

11. The method of claim 7 wherein said halide electrolyte is a chloride.

12. The method of claim 7 wherein said halide electrolyte is selected from the group consisting of iron, cadmium, zinc, nickel, lead, tin and manganese chlorides.

13. An electrical energy storage device, said storage device comprising electrochemically treated ungraphitized carbon, said electrochemical treatment including the steps of placing said ungraphitized carbon in an electrochemical cell as the positive electrode thereof, providing a negative electrode and an aqueous halide electrolyte solution which contacts the positive and negative electrode and passing a current through said electrolyte, said current being maintained at a level which maintains the voltage below the decomposition voltage of said halide electrolyte which would result in formation of free halogen, said ungraphitized carbon having been electrochemically treated for a time sufficient to store a substance in said carbon which may be recovered as electrical energy.

* * * * *